Patented Oct. 23, 1923.

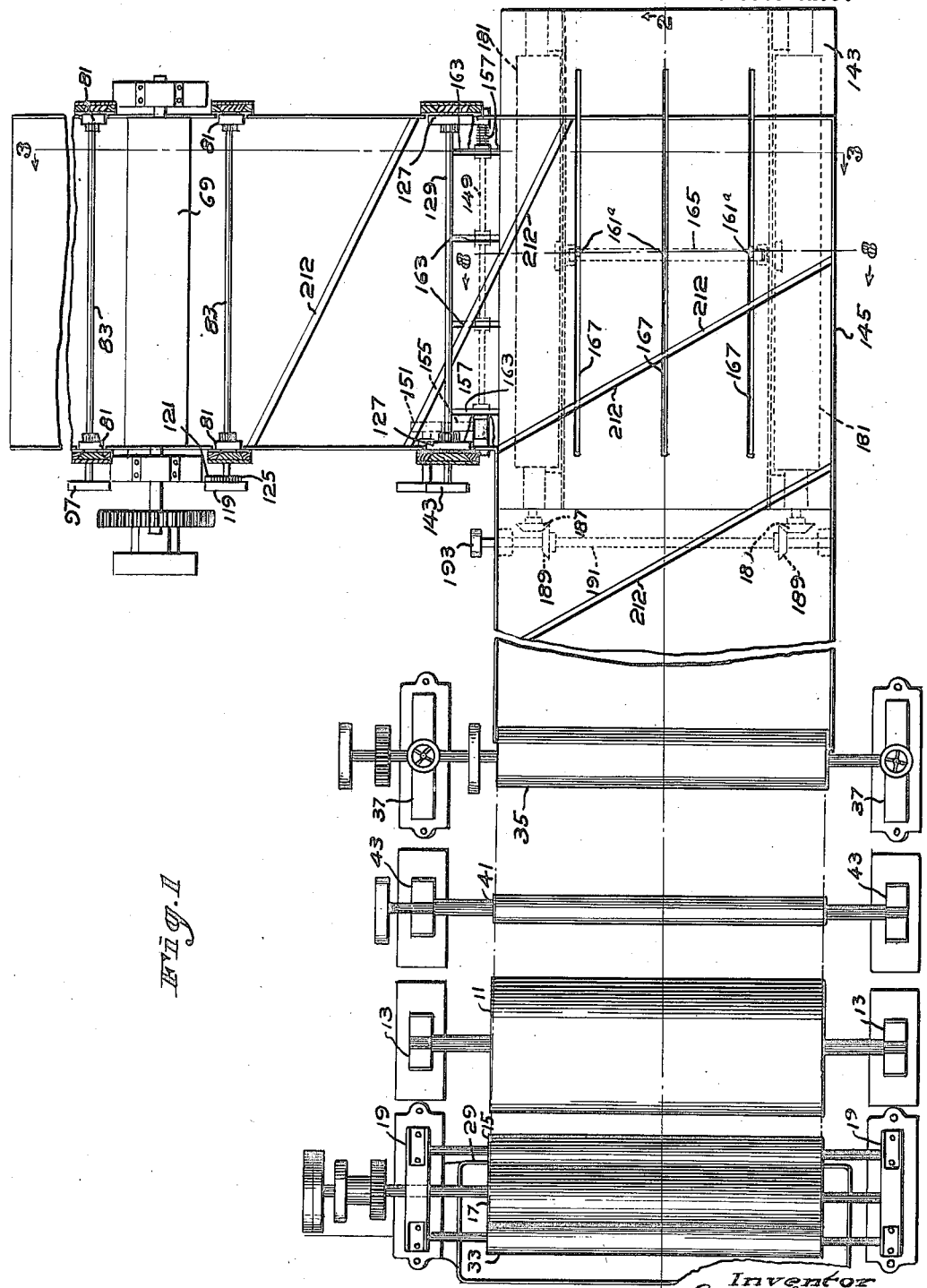

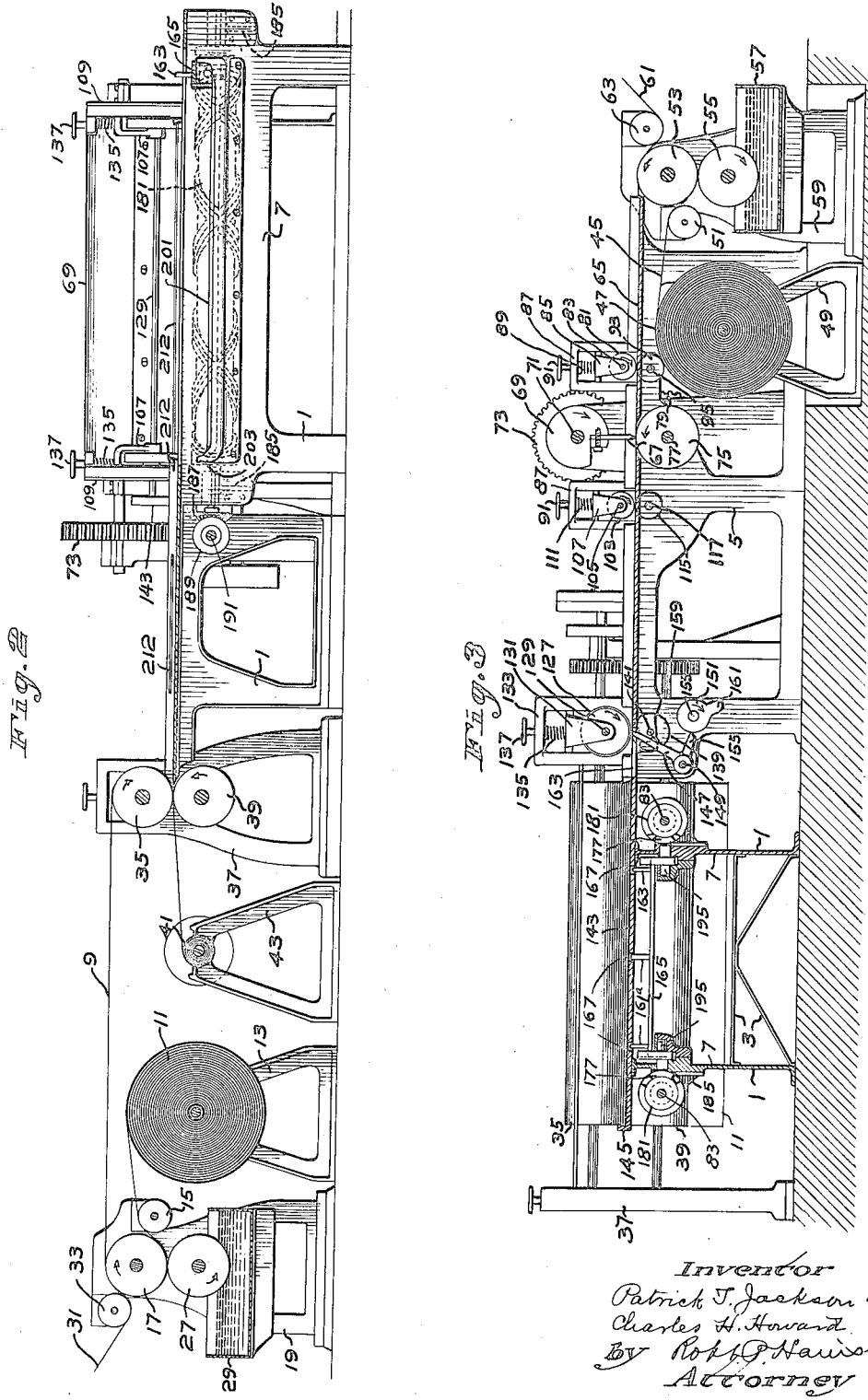

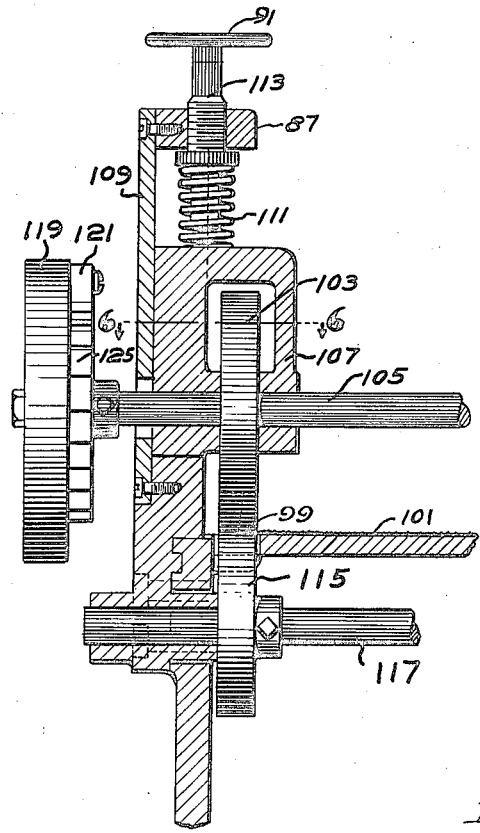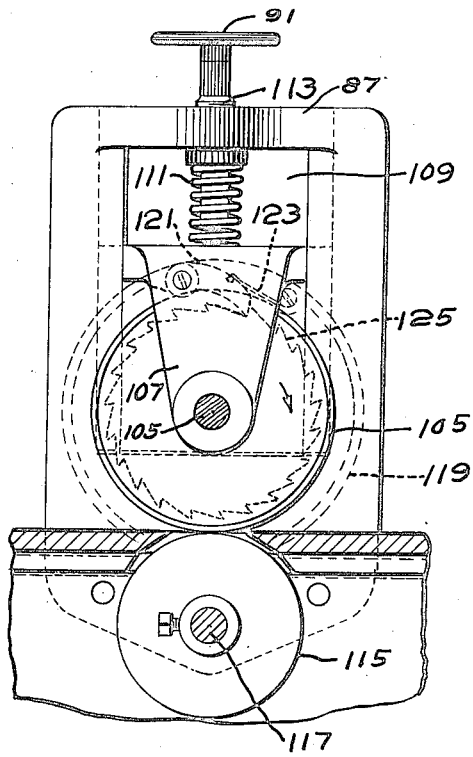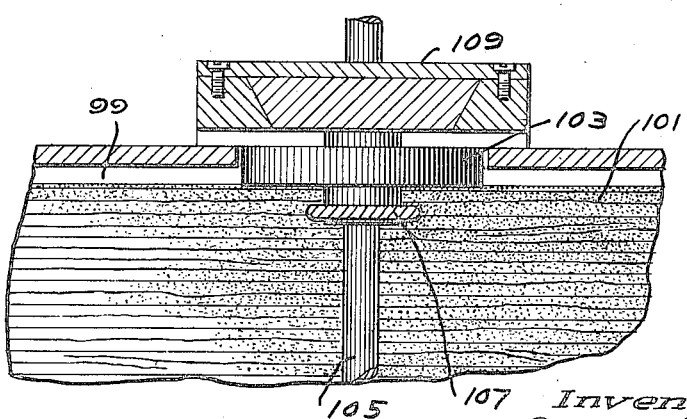

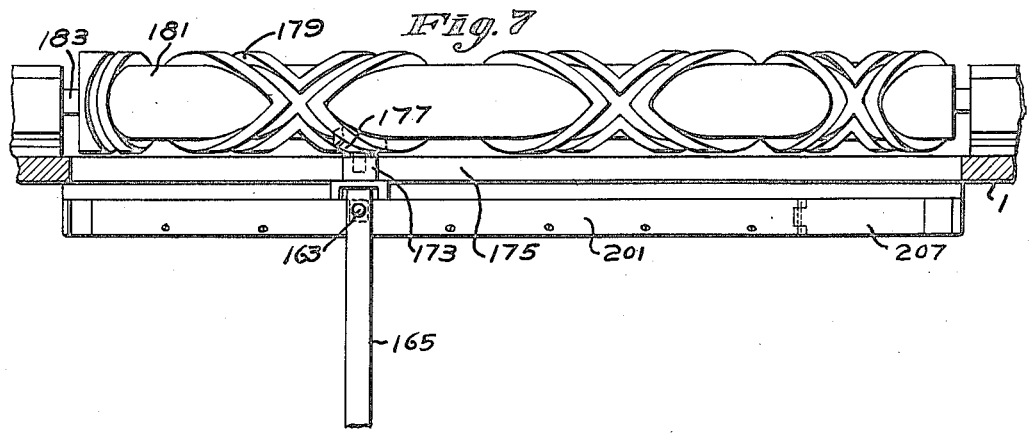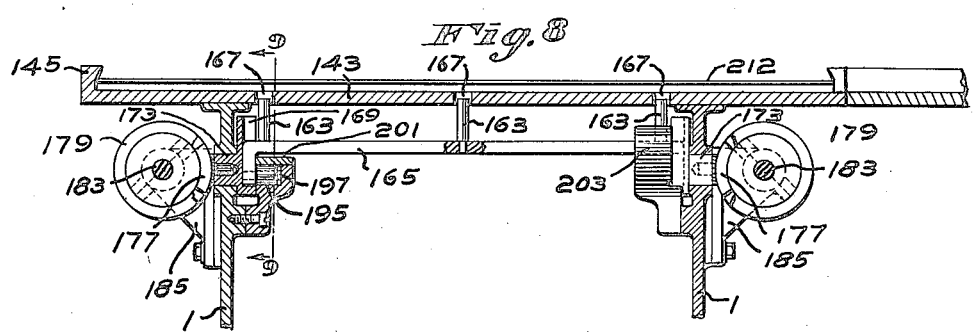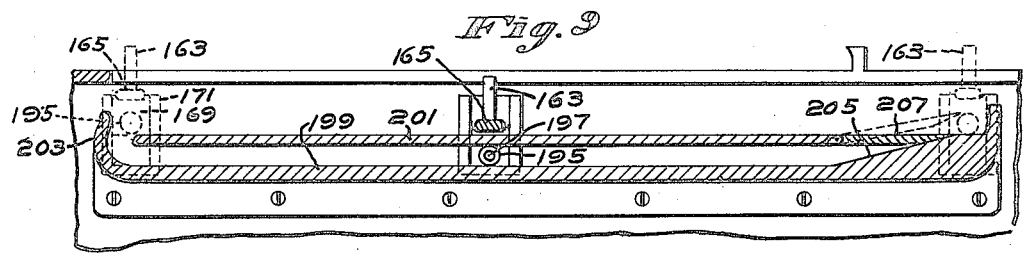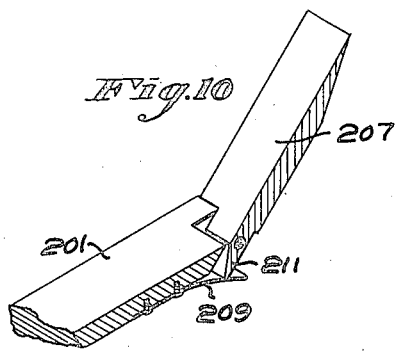

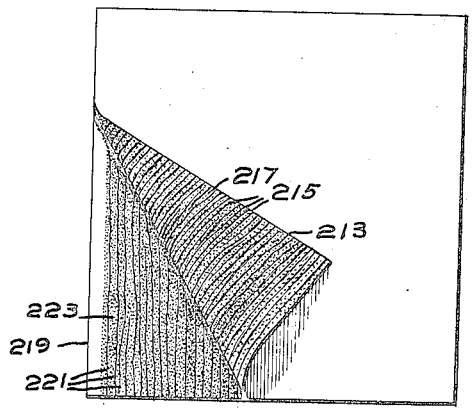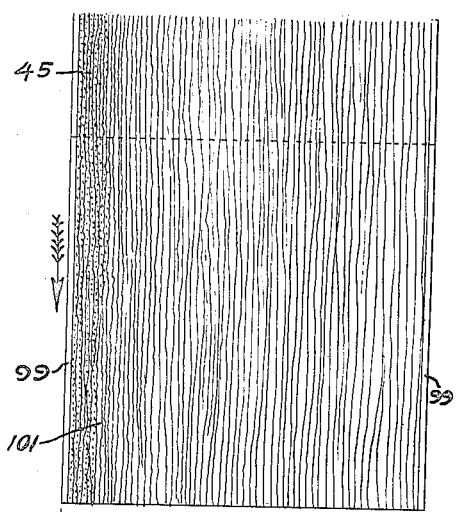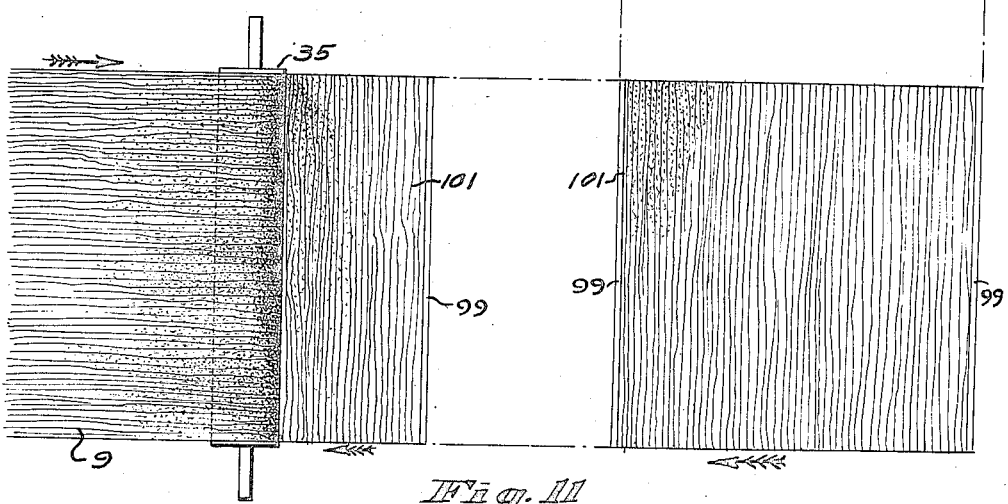

1,472,021

UNITED STATES PATENT OFFICE.

PATRICK T. JACKSON, OF CAMBRIDGE, AND CHARLES H. HOWARD, OF SAUGUS, MASSACHUSETTS, ASSIGNORS TO PAPER PRODUCTS MACHINE COMPANY, OF BOSTON, MASSACHUSETTS, A CORPORATION OF MASSACHUSETTS.

MACHINE FOR APPLYING REENFORCING FILAMENTS TO FABRICS.

Application filed January 4, 1919. Serial No. 269,573.

*To all whom it may concern:*

Be it known that we, PATRICK T. JACKSON and CHARLES H. HOWARD, citizens of the United States, residing at Cambridge, county of Middlesex, and Saugus, county of Essex, and State of Massachusetts, respectively, have invented an Improvement in Machines for Applying Reenforcing Filaments to Fabrics, of which the following description, in connection with the accompanying drawings, is a specification, like characters on the drawings representing like parts.

The invention to be hereinafter described relates to reinforced fabrics, such, for example, as paper adapted as a protecting cover or wrapper, or as an efficient material for making bags or other containers.

The fabric may be reinforced by filaments which may be unspun fibres in substantially their natural condition, such, for example, as ramie, hemp, sisal, flax and other forms of fibres.

The aims and purposes of the present invention are to provide a simple machine for expeditiously and effectively placing the reenforcing unspun filaments or fibers transversely of the fabric to be reinforced, and the fabric to be reinforced may or may not have reenforcing filaments or fibers extending longitudinally thereof.

In carrying the invention into practical effect, the unspun reenforcing filaments or fibers may be fed longitudinally to a strip of paper or other fabric, and may be adhesively secured thereto. The paper strip may be previously gummed and then moistened to secure the filaments thereto, or an adhesive coating may be applied to the paper strip as it is fed through the machine.

After the unspun filaments or fibers have been applied to the strip, the present invention contemplates that the sheet thus formed shall be severed at intervals to form sections or carriers. Then these sections may be applied to another strip of paper or other fabric which may or may not be reinforced by filaments or fibers extending longitudinally thereof, and adhesively secured thereto.

In accordance with the machine embodying the present invention, the sheet to be reinforced and the sheet from which the sections are severed are fed in transversely related paths, and the sections are then transferred from their original path to the path of the sheet to be reinforced, and are caused to overtake the latter sheet and arrive in superposed relation therewith. The construction is such that when both sheets are provided with reenforcing filaments, the product produced by the machine will have reenforcing filaments extending both longitudinally and transversely thereof.

Preferably the sections or carriers for the transverse reenforcing filaments are presented to the sheet to be reinforced, so that the reenforcing filaments will be between outer layers of paper or other fabric, and will be embedded in an adhesive layer which may desirably be of waterproof material between the outer layers.

It has been proposed heretofore to reinforce strips of paper with threads, cords and other forms of spun fibres and to form a multi-ply paper reinforced in this manner in order to produce a very strong paper as disclosed by the patent to Scherf No. 1,299,237 granted April 1, 1919, but the cost of the spun fibre used for this purpose adds very materially to the cost of the paper reinforced in this manner. An important object of the present invention, therefore, is to provide a machine for reenforcing paper with unspun fibre in order to produce a paper which is as strong as the paper heretofore reinforced by spun fibre, but which may be manufactured very much more cheaply.

The character of the invention may be best understood by reference to the following description of one good form of means for carrying the same into practical effect, shown in the accompanying drawings, wherein:—

Fig. 1 is a plan of a portion of a machine embodying the invention;

Fig. 2 is a vertical section through one portion of the machine, taken on line 2—2 of Fig. 1.

Fig. 3 is a vertical section through a portion of the machine disposed transversely to the portion shown in Fig. 2 and taken on line 3—3 of Fig. 1;

Fig. 4 on an enlarged scale is a vertical section showing one of the feeding devices for the reinforced strip which is cut into sections;

Fig. 5 is a side elevation of said device;

Fig. 6 is a horizontal section taken on line 6—6 of Fig. 4;

Fig. 7 on an enlarged scale is a plan of one of the feed screws for the transfer mechanism;

Fig. 8 is a vertical transverse section taken on line 8—8 of Fig. 1;

Fig. 9 is a vertical section taken on line 9—9 of Fig. 8;

Fig. 10 is a detail to be referred to;

Fig. 11 is a plan view showing the transverse paths of the reenforcing sections and the sheet reinforced thereby; and Fig. 12 is a plan view of one form of reinforced product which may be produced by the machine, one of the layers being folded back to disclose the disposition of the filaments between the layers.

Referring to the drawings, the machine shown therein as one good form of the invention, may be provided with a frame of any suitable character to support the various instrumentalities thereof, but as herein shown, it comprises a main frame including side frames 1 (Figs. 2 and 3) braced by suitable transverse members 3, and a main frame comprising side frames 5 disposed transversely to the side frames 1 and braced by suitable transverse members 7.

Suitable means may be provided for feeding the fabric to be reinforced through the machine. In the present instance, the fabric is in the form of a sheet of paper 9 (Fig. 2) which may be conducted from a suitable source of supply, such, for example, as the roll 11 mounted on standards 13.

In the present instance of the invention, one face of this paper sheet has an adhesive, preferably waterproof, such, for example, as black asphaltum applied thereto. To accomplish this, the sheet is passed over a guide roll 15 (Fig. 2) and around a roll 17 mounted in standards 19, and a roll 21 beneath the roll 17 serves to conduct the adhesive from a trough 29 to the face of the paper.

The unspun filaments or fibers may be applied to the face of the paper thus coated by any suitable means well known in the art, and therefore, unnecessary to illustrate herein. The filaments may be conducted in general parallel relation to the paper, and in the present instance, filaments 31 are guided beneath a roll 33 on the standards 19 to the adhesively coated surface of the paper passing over the roll 17.

The sheet of paper with the unspun filaments thereon may be conducted thence around a roll 35 mounted on standards 37 and over a roll 39 beneath the roll 35. In thus passing around the roll 35, the face of the paper having the adhesive coating and the filaments thereon is presented on the under side of the sheet to facilitate the application of the reenforcing sections thereto, as more fully hereinafter described. The fabric may be wound on a take-up roll 41 mounted on standards 43. The rolls described may be driven as required by any suitable means, which will be readily known to those skilled in the art, and therefore, it is unnecessary to illustrate and describe the same fully herein.

The present invention contemplates that a second sheet of paper or other suitable material shall have reenforcing filaments applied thereto and preferably in adhesive engagement therewith. To accomplish this, in the present instance, a sheet of paper 45 (Fig. 3) is fed from a suitable source of supply, such, for example, as the roll 47 mounted on standards 49, about a guide roll 51 and around a roll 53. An adhesive, preferably waterproof, is applied to one face of the sheet of paper by a roll 55 beneath the roll 53 and serving to transfer the adhesive from a trough 57 to the paper. The rolls 51, 53 and 55, and the trough 57 may be conveniently mounted on standards 59.

The reenforcing filaments for the paper sheet 45 may be applied thereto by suitable means well known in the art, and therefore, unnecessary to show and describe in detail herein. In the present instance, unspun filaments 61 are conducted from a suitable source of supply beneath a guide roll 63 mounted on the standards 59, to the paper as it passes around the roll 53. The paper with the filaments applied longitudinally thereof and in adhesive engagement therewith may be conducted thence along a table 65 mounted on the side frames 5, referred to.

The present invention contemplates that the paper sheet thus reinforced shall be cut transversely thereof at intervals to produce sections or carriers for the reenforcing filaments. Any suitable means may be provided for thus cutting the sheet of paper into sections. In the present instance, this cutter means comprises a knife 67 (Fig. 3) secured to a roll 69 having a shaft 71 mounted in bearings in uprights rising above the table from the side frames 5. This shaft has a gear 73 fast thereon which may be driven by any suitable means. Directly beneath the knife 67, a roll 75 may be provided on a shaft 77 journalled in bearings on the side frames 5, and having a gear 79 fast thereon meshing with and driven by the gear 73. The construction is such that the knife 67 will cut the sheet transversely thereof once in each revolution of the knife.

Suitable means may be provided for feeding the reinforced paper sheet to the cutting device. This means, in the present instance of the invention, comprises a pair of wheels 81 (Fig. 3) fast on a cross shaft 83 mounted in bearings in slides 85 movable vertically in guideways 87 mounted at opposite sides of the table on the side frames 5 of the machine conveniently adjacent the cutter device. These slides are pressed downward by coil springs 89 confined between the upper ends of said slides and a collar on an adjusting screw 91 threaded in the upper end of the guideway 87. Beneath and co-operating with the wheels 81, idler wheels 93 may be provided on a shaft 95 journalled in bearings on the side frames 5 of the machine. The shaft 71 for the other wheels may have a pulley 97 fast thereon which may be driven by any suitable means.

The construction is such that the wheels 81 and 93 will engage margins of the reinforced paper sheet 45 and feed the sheet over the table 65 to the cutting device. The width of the coating rolls is somewhat less than the width of the paper sheet so as to leave uncoated margins 99 (Fig. 11), in order that the wheels may not come in contact with the adhesive coating on the sheet when feeding the same.

Each time the cutter device makes a complete revolution, it will sever a section, such, for example, as the section 101 (Fig. 11) from the sheet 45.

Suitable means may be provided to feed the sections thus produced transversely to and toward the path of travel of the sheet 9 to be reinforced. To accomplish this, in the present instance, wheels 103 (Figs. 1, 3 and 4) may be provided on shafts 105 journalled in bearings in slides 107 movable vertically in guideways 109, said wheels being urged downwardly by coil springs 111 confined between the upper ends of the slides 107 and collars on adjusting screws 113 threaded in upper ends of said guideways. Beneath the wheels 103 are idler wheels 115 on a shaft 117 journalled in bearings in the side frames 5.

To drive the shaft 105, a pulley 119 may be loosely mounted thereon and carry a pawl 121 urged by a leaf spring 123 toward a ratchet 125 fast on the shaft 105. The construction is such that the pulley may rotate the shaft 105 through the pawl and ratchet, but the wheels 103 may be rotated more rapidly than the pulley 119 at times, as more fully hereinafter described.

The wheels 103 and 115 will engage the margins of the sections 101 and feed them along the table 65 away from the cutting device and toward the path of feed of the sheet to be reinforced. It is desirable that the sections should be rapidly fed from the table 65 to a transfer mechanism which moves the sections transversely to their path to and between the rolls 35 and 39 referred to, for feeding the sheet to be reinforced, in order that the section may be quickly transferred by said device without interference from a following section.

To this end, feed wheels 127 (Fig. 3) may be provided on a shaft 129 journalled in slides 131 movable vertically in guideways 133, said slides being urged downward by coil springs 135 confined between the upper ends of said slides and collars on adjusting screws 137 threaded in the upper ends of said guideways. Co-operating with the wheels 127 and beneath the same are idler wheels 139 on a shaft 141 journalled in bearings in the side frames 5. The shaft 129 has a pulley 143 fast thereon which may be driven by any suitable means.

To give a section fed by the wheels 127 and 139 a sufficient advance from the leading edge of the following section, the wheels 127 are constructed with a diameter, in the present instance, twice that of the wheels 103, so that a section fed by the wheels 127 will be fed twice as fast as a section fed by the wheels 103. The length of a section is somewhat greater than the distance between the axes of the wheels 103 and 127, so that the latter may engage the leading end of a section before the trailing end thereof leaves the wheels 103. The wheels 103, however, will not interfere with the acceleration in the feed of the section, since as soon as the section is nipped between the wheels 127 and 139 and fed more rapidly, the frictional engagement of the section with the wheels 103 will cause them to rotate more rapidly than when driven by the pulley 119, the ratchet 125 wiping idly past the pawl 123 at such time.

The section is fed by the wheels 127 onto the transfer device, which, in the present instance, comprises a table 143 (Figs. 1, 2 and 3) at one end of the table 65 and extending transversely to said table and in line with the path of feed of the paper to be reinforced. The wheels 127 will feed a section onto the table 143, but since said wheels are at one side of said table, they will not feed the section entirely to the edge 145 of the table furthest from the feed wheels 127.

Suitable means may be provided to complete the feed of a section to the edge 145 of the table. This means, in the present instance, comprises a series of arms 147 (Figs. 1 and 3) fast on a rock shaft 149 mounted in bearings on the side frame 5 of the machine. A cam 151 is provided on a shaft 153 mounted on the side frames 5 adjacent the rock shaft 149, and is adapted to engage an actuating arm 155 fast on said rock shaft. The outer arms 147 are urged by coil springs 157 (Fig. 1) toward stops 159.

The construction is such that in the course of each revolution of the cam 151, a finger 161 thereof will engage the arm 155 and rock the arms 147 through slots 161ª in the table 65 toward the left of Fig. 3, thereby causing the arms to engage the trailing ends of a section and shift the section on the table 143 until the leading end thereof reaches the edge 145 of said table. The cam finger 161 may have an end of sufficient width temporarily to hold the section against said edge and serve as a guide therefor. As soon as the finger 161 passes the arm 155, the coil springs 157 will rock the arms 147 to the right of Fig. 3, where the outer arms will rest against the stops 159 in readiness to complete the feed of the next section onto the table 143.

The present invention contemplates the provision of suitable means to quickly transfer the section from the table 143 to and between the rolls 35 and 39 for feeding the paper sheet to be reinforced. To accomplish this, in the present instance of the invention, push pins 163 (Figs. 7, 8 and 9) may be provided on a cross bar 165 located beneath the table 43. The pins 163 are adapted to project upward through elongated slots 167 in the table 143 and engage an edge of a section and then advance along said table toward the rolls 35 and 39 to push or transfer the section along the table to said rolls. After the pins have thus advanced a section, they are retracted downward beneath the table 143 and return to their original positions, where they are in readiness to advance the next section.

Suitable means may be provided to impart the movements described to the push pins 163. For this purpose the ends of the bar 165 are connected to or formed integral with heads 169 (Fig. 9) movable vertically in guideways 171 on slides 173 movable horizontally in elongated slots 175 in the side frames 1 referred to.

Swivelled in the slides 173 are shoes or followers 177 working in grooves 179 forming double screws on cylinders 181 on shafts 183 journalled in bearings in brackets 185 (Fig. 8) mounted on the side frames 1 of the machine.

Bevel gears 187 (Fig. 1) fast on ends of the shafts 183 mesh with bevel gears 189 fast on a cross shaft 191 journalled in bearings on the side frames 1. A pulley 193 fast on one end of the shaft 191 may be driven at the proper speed by any suitable means.

The construction is such that the slides 173, the bar 165 and push pins 163 will be automatically reciprocated in the direction of the length of the table 143.

To raise and lower the push pins 163 at the times required, followers conveniently in the form of rollers 194 (Fig. 8) may be provided on pins 197 secured to the heads 169 referred to of the bar 165, said followers being adapted to travel along lower tracks 199 and upper tracks 201. To transfer the followers from the upper tracks to the lower tracks, the latter may be formed somewhat longer than the upper tracks and have upturned ends 203, the construction being such that when the followers pass over the ends of the upper tracks adjacent the upturned ends 203, they will drop down onto the lower tracks. To transfer the followers from the lower tracks to the upper tracks, the former may be formed to present inclines 205, and switches 207 may be pivotally connected to the upper tracks and may be normally urged down into engagement with the inclines 205 by leaf springs 209 (Fig. 10) secured to the upper tracks and adapted to engage heels 211 on said switches. The construction is such that as the followers travel along the lower tracks toward the right of Fig. 9, they will ride up along the inclines 205 and thereby rock the switches from their full line to their dotted position shown in said figure, and then pass to their positions shown in dotted lines at the right of Fig. 9. Thereupon, the springs 209 will rock the switches down again to the inclines so that the followers will ride over said switches onto the upper tracks when they are fed toward the left of Fig. 9. The heads 169 will readily move upward and downward in the guideways 171 to allow the movement of the followers to and from the upper and lower tracks as described.

To prevent any possibility of puckering of the sections, bars 212 may be disposed somewhat above the tables 65 and 143 and be secured to flanges at the sides of the table and extend obliquely to the direction of movement of the sections over said tables.

The operation of the machine will be readily understood. The sections will be progressively fed along the table 65 onto the table 143, and then they will be fed transversely to their direction in approaching said table to and between the rolls 35 and 39 for feeding the sheet to be reinforced. Thus, the sections are presented to said sheet with their unspun filaments extending transversely thereto. As the sections pass over the table 143, the faces thereof having the adhesive coating and filaments thereon are uppermost, and thus are presented to and pressed against the under surface of the sheet to be reinforced passing between the rolls 35 and 39. If the sheet to be reinforced is provided with an adhesive coating and filaments extending longitudinally of said sheet, the reenforcing filaments for the sections and the sheet will be intermediate the sections and sheet. After the sections thus united with the sheet pass beyond the rolls 35 and 39, they are wound on the take-up roll 41 referred to.

The sections and the sheet to be reinforced may be of any desired size. If the purpose of the product produced is to supply blanks for forming paper bags, the sections may conveniently be of the proper size to produce a paper bag. As a consequence, when the sheet reinforced by the sections is severed along transverse lines at the juncture of the sections disposed in end-to-end relation on the sheet to be reinforced, a blank will be obtained of the proper form to produce the bag.

In Fig. 12 is shown a product which may be produced by the machine comprising a sheet of paper 213 having reenforcing filaments extending longitudinally thereof, in the form of unspun fibres 215 secured to said sheet by a waterproof adhesive coating 217. Superposed on the sheet 213 is a sheet 219 having reenforcing filaments extending transversely thereof in the form of unspun fibres 221 secured to said sheet by a waterproof adhesive coating 223. As stated, margins of the sections are not coated with adhesive to facilitate feeding thereof as described. The sheet to be reinforced, however, may have an adhesive coating throughout the width thereof which will thus serve to secure the uncoated margins of the sections to said sheet. As a consequence, there is no waste at the margins of the sections.

It will be understood that the invention is not limited to the specific embodiment shown, and that various deviations may be made therefrom without departing from the spirit and scope of the appended claims.

What is claimed is:—

1. A machine for applying reenforcing filaments to paper comprising, in combination, means to feed paper sheets reinforced by longitudinally extending unspun fibers in transverse paths, means to sever sections from one of said sheets, and means progressively to feed said sections in the same direction as the other sheet and to overtake said sheet.

2. A machine for applying reenforcing filaments to paper comprising, in combination, a table, means to feed a sheet reinforced by longitudinal filaments along said table, means to cut said sheet at intervals to produce sections, a table extending transversely to said first table, means to feed said sections from said first table to said second table, a pair of feed rolls, means to transfer said sections from said second table to said feed rolls, and means to feed a sheet to be reinforced to said feed rolls in superposed relation with said sections.

3. A machine for applying reenforcing filaments to paper comprising, in combination, means to feed a sheet reinforced by filaments longitudinally, means to cut said sheet transversely at intervals to produce sections, feeding means to advance a leading section a space ahead of a following section, means to feed the leading section transversely to and out of the path of the following section, and means to apply the sections progressively to a sheet to be reinforced.

4. A machine for applying reenforcing filaments to paper comprising, in combination, means longitudinally to feed a sheet reinforced by filaments, means to cut said sheet transversely at intervals to produce sections, means including a feed screw and fingers reciprocated thereby to feed the sections progressively transversely to said sheet, and means then to apply the sections progressively on a sheet to be reinforced.

5. A machine for applying reenforcing filaments to paper comprising, in combination, means longitudinally to feed a sheet reinforced by filaments, means transversely to cut said sheet at intervals to produce sections, a pusher device to engage edges of said sections and push the same transversely to the direction of feed of said sheet, means to reciprocate said pusher device, means to move said device into and out of the plane of the sections, and means to receive the sections and apply them to a sheet to be reinforced.

6. In a paper reenforcing machine, in combination, transversely related tables, means to fed a sheet reinforced by filaments along one of said tables, means to cut said sheet at intervals to produce sections, means to fed the leading section forward and laterally at an accelerated speed out of the path of movement of the immediately following section and along the other table, and means to apply said sections successively to a second sheet to reinforce the same.

7. A machine for applying reenforcing filaments to paper comprising, in combination, means to feed sections reinforced by filaments in one path, reciprocating means to feed said sections in a second path transversely to the first, fingers carried by said reciprocating means constructed to project into engagement with said sections when said reciprocating means is moved in one direction and to be held out of the plane of said sections when the reciprocating means is moved in the opposite direction.

8. In a paper reenforcing machine, in combination, transversely related tables, means to feed a sheet reinforced by filaments continuously along one of said tables, rotatable means to cut said sheet while in transit into sections, means to feed the sections along the other table laterally to the directions of travel of the sheet, and means to apply said sections successively to a second sheet of paper.

9. In a paper reenforcing machine, in combination, means to feed sheets reinforced by filaments in transverse paths, means for cutting one of said sheets into sections, means for feeding said sections longitudinally and laterally respectively along a single plane to the other sheet, and means for applying said sections successively to said last mentioned sheet.

10. In a paper reenforcing machine, in combination, a longitudinally extending table, means for feeding a sheet reinforced by filaments adjacent said table, means for feeding sections reinforced by filaments successively upon said table from one side thereof, and means for conveying said sections along said table and applying them to said sheet.

11. A machine for applying reenforcing filaments to paper comprising, in combination, means for feeding lengthwise a sheet of paper having reenforcing filaments extending longitudinally thereof, means for cutting said sheet into reinforced sections, means to feed the leading section forward in a predetermined plane, means for feeding said sections laterally in said plane at an accelerated speed out of the path of movement of the immediately following section, and means to apply said sections successively to a second sheet with the filaments of the sections running transversely of the second sheet.

12. A machine for applying reenforcing filaments to paper, comprising, in combination, means for feeding a sheet of paper in the direction of its length, means for feeding a second sheet of paper in a direction at right angles to the first and for applying reenforcing filaments lengthwise of the second sheet, rollers disposed along the path of said second sheet and arranged to engage only the marginal edge of the sheet to advance it, a cutter for severing the sheet into sections as it travels along said path, means for operating the roller that engages the sections at a higher peripheral speed than the other rollers to accelerate the movement of the sections, and means for feeding the sections laterally toward the first sheet and for applying the sections thereto with the unspun fibres of the sections running transversely of the first sheet.

In testimony whereof, we have signed our names to this specification.

PATRICK T. JACKSON.
CHARLES H. HOWARD.